United States Patent
Hara

(10) Patent No.: US 12,518,535 B2
(45) Date of Patent: Jan. 6, 2026

(54) INFORMATION PROCESSING DEVICE, LEARNING DEVICE, AND METHOD FOR CONTROLLING INFORMATION PROCESSING DEVICE

(71) Applicant: SEIKO EPSON CORPORATION, Tokyo (JP)

(72) Inventor: Motoaki Hara, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 771 days.

(21) Appl. No.: 17/650,115

(22) Filed: Feb. 7, 2022

(65) Prior Publication Data

US 2022/0254159 A1    Aug. 11, 2022

(30) Foreign Application Priority Data

Feb. 8, 2021    (JP) .................................. 2021-017950

(51) Int. Cl.
| | |
|---|---|
| *G06K 9/00* | (2022.01) |
| *G06N 20/00* | (2019.01) |
| *G06V 20/50* | (2022.01) |
| *G09B 3/00* | (2006.01) |

(52) U.S. Cl.
CPC ............. *G06V 20/50* (2022.01); *G06N 20/00* (2019.01); *G09B 3/00* (2013.01)

(58) Field of Classification Search
CPC .... G06V 10/774; G06V 20/50; G06V 30/413; G06V 30/10; G06N 20/00
See application file for complete search history.

(56) References Cited

U.S. PATENT DOCUMENTS

| | | | |
|---|---|---|---|
| 11,656,328 B2* | 5/2023 | Shmueli ............... | G06V 10/776 382/103 |
| 11,928,878 B2* | 3/2024 | Agrawal .............. | G06V 30/412 |
| 2002/0144226 A1* | 10/2002 | Nitta ..................... | G06F 40/103 716/132 |
| 2015/0341651 A1* | 11/2015 | Zhu ........................ | H04L 9/0819 382/233 |
| 2016/0224516 A1* | 8/2016 | Clar ....................... | G06Q 10/10 |

(Continued)

FOREIGN PATENT DOCUMENTS

| | | |
|---|---|---|
| JP | 2014-029572 | 2/2014 |
| JP | 2015-018159 | 1/2015 |
| JP | 2016-040580 | 3/2016 |

*Primary Examiner* — Avinash Yentrapati
(74) *Attorney, Agent, or Firm* — WORKMAN NYDEGGER

(57) ABSTRACT

An information processing server includes an information processing server storage unit that stores a machine-learned learning model based on a data set in which data of a teaching material content is associated with attribute information indicating an attribute of the teaching material content, a receiver that acquires the data of the teaching material content, and an input and output processing unit that inputs the data of the teaching material content acquired by the receiver to the learning model stored in the information processing server storage unit and causes the attribute information to be output from the learning model. The information processing server storage unit stores a related information record in which the data of the teaching material content acquired by the receiver is associated with the attribute information output from the learning model by the input and output processing unit.

8 Claims, 8 Drawing Sheets

(56) References Cited

U.S. PATENT DOCUMENTS

| | | | | |
|---|---|---|---|---|
| 2018/0349388 A1* | 12/2018 | Skiles | ................... | G06F 16/358 |
| 2020/0279108 A1* | 9/2020 | Shorter | ................. | G06F 40/279 |
| 2021/0089764 A1* | 3/2021 | Shorter | ................... | G06F 40/30 |
| 2021/0191981 A1* | 6/2021 | Deibler | ................. | G06F 16/345 |
| 2021/0224306 A1* | 7/2021 | Choudhary | ........ | G06Q 30/0281 |
| 2021/0295031 A1* | 9/2021 | Shorter | ................... | G06F 16/35 |
| 2022/0343444 A1* | 10/2022 | Chan | ..................... | G06F 16/353 |
| 2023/0134989 A1* | 5/2023 | Hron, II | ................ | G06F 40/279 706/12 |

* cited by examiner

INFORMATION PROCESSING DEVICE, LEARNING DEVICE, AND METHOD FOR CONTROLLING INFORMATION PROCESSING DEVICE

The present application is based on, and claims priority from JP Application Serial Number 2021-017950, filed Feb. 8, 2021, the disclosure of which is hereby incorporated by reference herein in its entirety.

BACKGROUND

1. Technical Field

The present disclosure relates to an information processing device, a learning device, and a method for controlling an information processing device.

2. Related Art

Conventionally, a technique for defining attributes such as a subject name, a unit name, and a target grade for a teaching material content is known.

For example, JP-A-2015-018159 discloses the following system. In the case where meta information is given to an electronic teaching material, the system analyzes the meta information given to the electronic teaching material to identify a grade, a subject name, a unit name, and the like for the electronic teaching material and categorizes the electronic teaching material based on the identification results.

However, in JP-A-2015-018159, when the meta information is not given to the electronic teaching material, a user needs to register the attributes such as the grade, the subject, and the unit. Therefore, in JP-A-2015-018159, when the meta information is not given to the electronic teaching material, and the user does not register the attributes, it is difficult to define the attributes of the electronic teaching material.

SUMMARY

To solve the foregoing problems, according to an aspect of the present disclosure, an information processing device includes a storage unit that stores a machine-learned learning model based on a data set in which image data of a teaching material content is associated with attribute information indicating an attribute of the teaching material content; an acquirer that acquires the image data; a processing unit that inputs the image data acquired by the acquirer to the learning model stored in the storage unit and causes the attribute information to be output from the learning model; and an association information storage unit that stores association information in which the image data acquired by the acquirer is associated with the attribute information output from the learning model by the processing unit.

To solve the foregoing problems, according to another aspect of the present disclosure, a learning device includes a learning unit that acquires a data set in which image data of a teaching material content is associated with attribute information indicating an attribute of the teaching material content, and performs machine learning based on the data set; and a storage unit that stores a machine-learned learning model.

To solve the foregoing problems, according to still another aspect of the present disclosure, a method for controlling an information processing device includes storing a machine-learned learning model based on a data set in which image data of a teaching material content is associated with attribute information indicating an attribute of the teaching material content; acquiring the image data; inputting the acquired image data to the machine-learned learning model based on the data set in which the image data of the teaching material content is associated with the attribute information indicating the attribute of the teaching material content, and outputting the attribute information from the learning model; and storing association information in which the acquired image data is associated with the attribute information output from the learning model.

DESCRIPTION OF EXEMPLARY EMBODIMENTS

Figure 1:
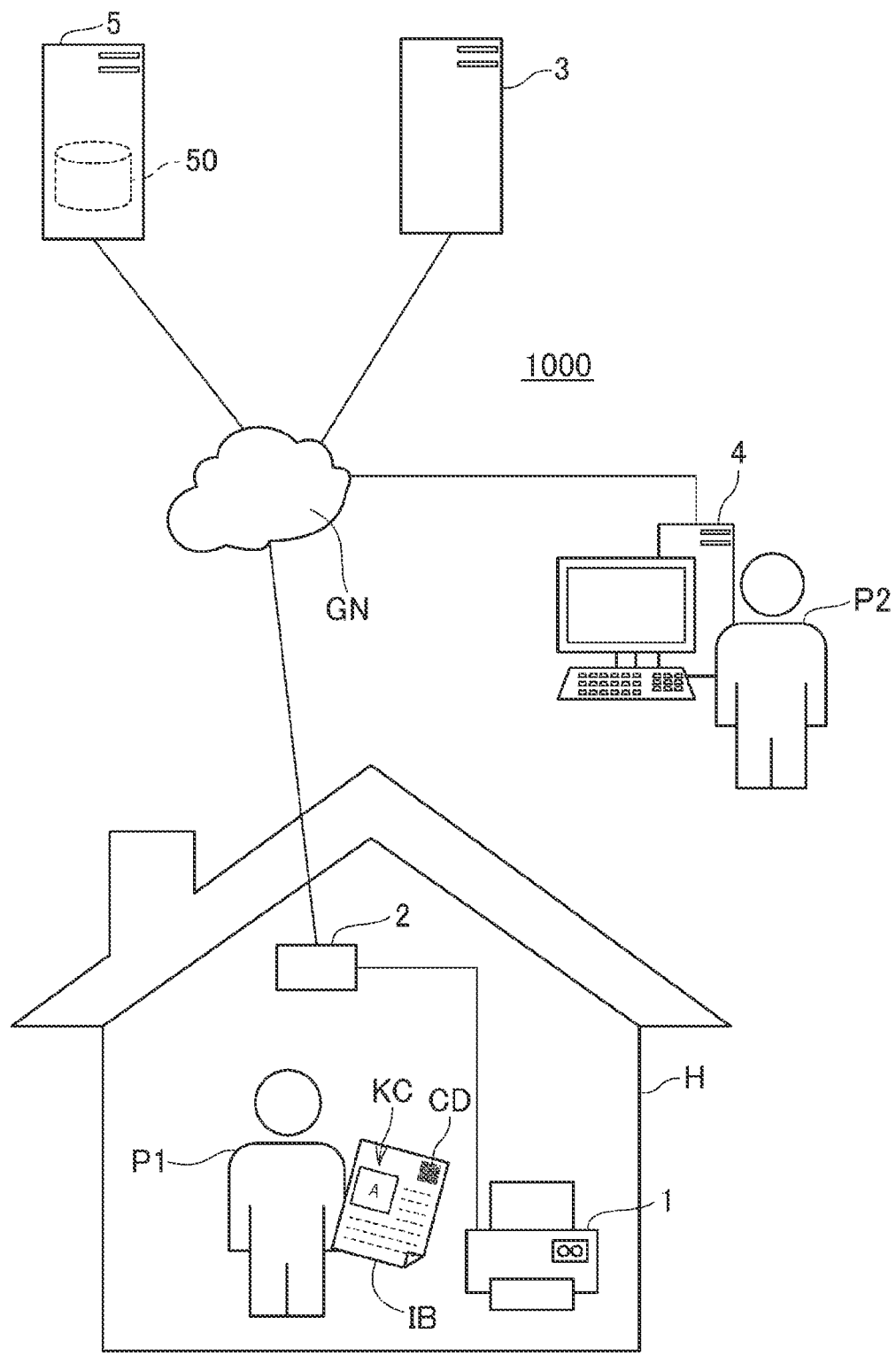
FIG. 1 is a diagram illustrating a configuration of an information processing system.

FIG. 1 is a diagram illustrating a configuration of an information processing system 1000.

The information processing system 1000 performs various types of information processing on a teaching material content KC. In the information processing system 1000, a multifunction machine 1 generates a printed sheet having the teaching material content KC printed thereon, thereby providing the teaching material content KC to a learner who does learning. In the following description, the printed sheet having the teaching material content KC printed thereon is referred to as "teaching material content printed sheet". A reference sign "IB" is given to the teaching material content printed sheet.

The multifunction machine 1 corresponds to an example of a printing device.

The teaching material content KC described in the present embodiment is provided for a learner to do learning and allows the learner to answer a question. The teaching material content KC includes the question and allows the learner to answer the question. In the present embodiment, as the learner, a student P1 enrolled in a school, a private tutoring school, or the like is exemplified.

The information processing system 1000 includes the multifunction machine 1. The multifunction machine 1 is called a multifunction peripheral (MFP) and is a device that can execute various types of processing such as printing and scanning. The multifunction machine 1 illustrated in FIG. 1 is installed in a house H of the student P1. The multifunction machine 1 may be a device owned by the student P1 or a person involved who has a predetermined relationship such as a parent-child relationship with the student P1, or may be a device rented by the student P1 or the person involved from a company that does rental business, or may be a device lent by the school, the private tutoring school, or the like to the student P1 or the person involved.

The multifunction machine 1 is connected to a communication device 2 installed in the house H and communicates via the communication device 2 with an information processing server 3 connected to a global network GN. The global network GN includes the Internet, a telephone network, and another communication network.

The information processing server 3 corresponds to an example of an information processing device and an example of a learning device.

The communication device 2 is connected to the global network GN and communicates with the information processing server 3 connected to the global network GN. The communication device 2 is an interface device that connects the multifunction machine 1 to the global network GN and has a model function, a router function, a network address translation (NAT) function, and the like.

The information processing system 1000 includes the information processing server 3. The information processing server 3 is a server device that executes various types of processing on the teaching material content KC. The information processing server 3 is connected to the global network GN and communicates with the multifunction machine 1, a terminal device 4, and a teaching material content providing server 5. In each of drawings, the information processing server 3 is represented by one block, which does not mean that the information processing server 3 is constituted by a single server device. For example, the information processing server 3 may include a plurality of server devices that execute different types of processing. The information processing server 3 may include a plurality of server devices that store different databases.

The information processing system 1000 includes the terminal device 4. The terminal device 4 is a personal computer (PC) that is used by a person involved who has a predetermined relationship with the learner. The present embodiment exemplifies, as the person involved, a teacher P2 who is enrolled in the school, the private tutoring school, or the like and teaches academic subjects to the student P1. The present embodiment exemplifies a desktop PC as the terminal device 4. However, the terminal device 4 may be a laptop PC, a tablet PC, or a smartphone. The terminal device 4 is communicatively connected to the global network GN and communicates with the information processing server 3 via the global network GN. The terminal device 4 may be a device owned by the teacher P2, or may be a device rented by the teacher P2 from a company that does rental business, or may be a device lent to the teacher P2 by the school, the private tutoring school, or the like to which the teacher P2 is enrolled.

The information processing system 1000 includes the teaching material content providing server 5. The teaching material content providing server 5 is a server device that manages the teaching material content KC that is provided by a teaching material content provider such as a publisher. The teaching material content providing server 5 is connected to the global network GN and communicates with the information processing server 3. The teaching material content providing server 5 stores a teaching material content management DB 50. The teaching material content management DB 50 is described later.

In the present embodiment, the number of multifunction machines 1 included in the information processing system 1000 is not limited and may be two or more. When the number of multifunction machines 1 included in the information processing system 1000 is two or more, the multifunction machines 1 may be installed in houses H of different students P1. In addition, the number of terminal devices 4 included in the information processing system 1000 is not limited and may be two or more, like the multifunction machine 1.

Figure 2:
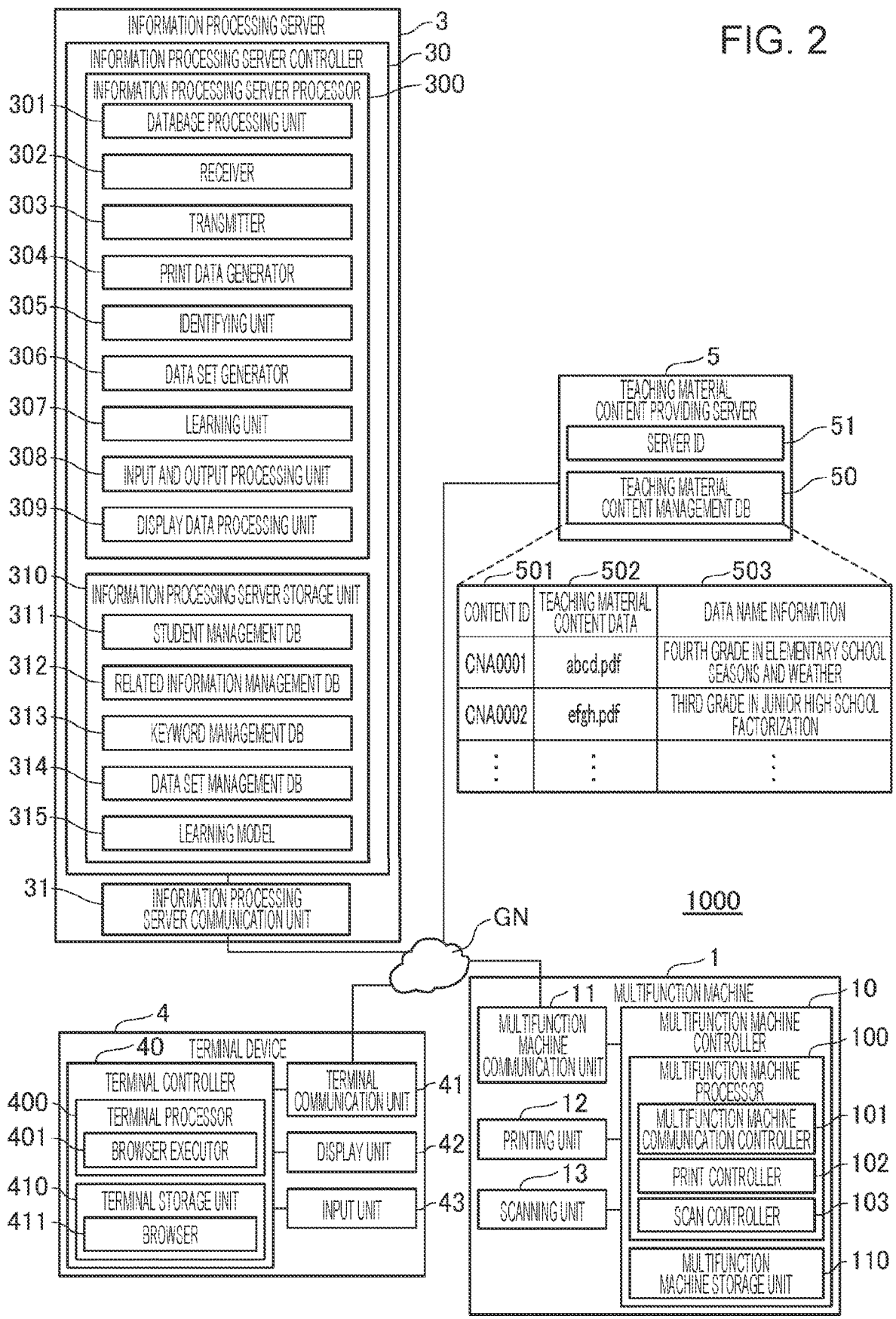
FIG. 2 is a diagram illustrating a configuration of each of devices included in the information processing system.

FIG. 2 is a diagram illustrating a configuration of each of the devices included in the information processing system 1000.

First, the multifunction machine 1 is described below.

The multifunction machine 1 includes a multifunction machine controller 10, a multifunction machine communication unit 11, a printing unit 12, and a scanning unit 13.

The multifunction machine controller 10 includes a multifunction machine processor 100 and a multifunction machine storage unit 110. The multifunction machine processor 100 is a processor that is a central processing unit (CPU), a micro-processing unit (MPU), or the like and executes a program. The multifunction machine controller 10 controls each of the units of the multifunction machine 1 by causing the multifunction machine processor 100 to read and execute a control program stored in the multifunction machine storage unit 110. The multifunction machine controller 10 causes the multifunction machine processor 100 to read and execute the control program stored in the multifunction machine storage unit 110, thereby functioning as a multifunction machine communication controller 101, a print controller 102, and a scan controller 103.

The multifunction machine storage unit 110 includes a memory that stores the program to be executed by the multifunction machine processor 100 and data to be processed by the multifunction machine processor 100. The multifunction machine storage unit 110 stores the control program to be executed by the multifunction machine processor 100 and other various data. The multifunction machine storage unit 110 has a nonvolatile storage region. The multifunction machine storage unit 110 may have a volatile storage region that constitutes a work area of the multifunction machine processor 100.

The multifunction machine communication unit 11 is a communication interface having a wireless circuit, an antenna, and the like and communicates with the information processing server 3 in accordance with a predetermined communication standard. The communication standard of the multifunction machine communication unit 11 may be a wireless communication standard or a wired communication standard.

The printing unit 12 has a configuration for printing. Specifically, the printing unit 12 includes an ink jet head that forms a dot by ejecting ink onto a print medium, a carriage that causes the ink jet head to operate in a scan direction, a carriage drive motor that drives the carriage, a transport unit that transports the print medium, an ink supply unit that supplies the ink to the ink jet head, and the like. The printing unit 12 performs printing on the print medium by ejecting the ink from a nozzle of the ink jet head to form a dot on a print surface of the transported print medium under control by the multifunction machine controller 10.

The scanning unit 13 has a configuration for reading. Specifically, the scanning unit 13 includes a scanner or the like that reads a character and an image recorded on a document sheet. For example, the scanning unit 13 reads the recorded character and the recorded image by applying light emitted by a light source to the portions to be read and outputs image data obtained by the reading to the multifunction machine controller 10. The multifunction machine controller 10 performs data processing such as RGB conversion and compression processing on the image data received from the scanning unit 13 to generate data in a predetermined format as read data.

The multifunction machine controller 10 functions as the multifunction machine communication controller 101, the print controller 102, and the scan controller 103.

The multifunction machine communication controller 101 communicates with the information processing server 3 via the multifunction machine communication unit 11.

The print controller 102 controls the printing unit 12 to perform printing on a print medium based on print data.

The scan controller 103 controls the scanning unit 13 to read, from a portion to be read, a character and an image to generate read data.

Next, the terminal device 4 is described.

The terminal device 4 includes a terminal controller 40, a terminal communication unit 41, a display unit 42, and an input unit 43.

The terminal controller 40 includes a terminal processor 400 and a terminal storage unit 410. The terminal processor 400 is a processor that is a CPU, an MPU, or the like and executes a program. The terminal controller 40 controls each of the units of the terminal device 4 by causing the terminal processor 400 to read and execute a control program stored in the terminal storage unit 410. The terminal controller 40 causes the terminal processor 400 to execute a browser 411 stored in the terminal storage unit 410, thereby functioning as a browser executor 401.

The terminal storage unit 410 includes a memory that stores the program to be executed by the terminal processor 400 and data to be processed by the terminal processor 400. The terminal storage unit 410 stores the control program to be executed by the terminal processor 400, the browser 411 and other various data. The terminal storage unit 410 has a nonvolatile storage region. The terminal storage unit 410 may have a volatile storage region that constitutes a work area of the terminal processor 400.

The browser 411 is a program for accessing a web page provided by the information processing server 3.

The terminal communication unit 41 is a communication interface having a wireless circuit, an antenna, and the like and communicates with a device connected to the global network GN in accordance with the predetermined communication standard. The predetermined communication standard may be the wireless communication standard or the wired communication standard.

The display unit 42 includes a display and displays information under control by the terminal controller 40. The display unit 42 may be an external display separated from the terminal device 4.

The input unit 43 is an input interface that is coupled to an input section such as an operational switch included in the terminal device 4, a panel having a touch input function, a mouse, or a keyboard, detects an operation performed on the input section by a user, and outputs a result of the detection to the terminal controller 40. The terminal controller 40 performs a process corresponding to the operation performed on the input section, based on the detection result received from the input unit 43.

The terminal controller 40 functions as the browser executor 401.

The browser executor 401 accesses a predetermined address of the information processing server 3 to receive, via the terminal communication unit 41, display data for displaying the web page. Then, the browser executor 401 causes the display unit 42 to display the web page based on the display data received via the terminal communication unit 41.

Next, the teaching material content providing server 5 is described.

The teaching material content providing server 5 stores a server ID 51 and a teaching material content management DB 50.

The server ID 51 is identification information identifying the teaching material content providing server 5.

The teaching material content management DB 50 is a database that manages the teaching material content KC. A record of the teaching material content management DB 50 includes a content ID 501, teaching material content data 502, and data name information 503.

The content ID 501 is identification information identifying the teaching material content KC.

The teaching material content data 502 is image data of the teaching material content KC identified by the content ID 501. FIG. 2 exemplifies Portable Document Format (PDF) as a data format of the teaching material content data 502. However, the data format of the teaching material content data 502 is not limited to PDF and may be another format such as JPEG.

The data name information 503 indicates a data name of the teaching material content KC.

Next, the information processing server 3 is described.

The information processing server 3 includes an information processing server controller 30 and an information processing server communication unit 31.

The information processing server controller 30 includes an information processing server processor 300 and an information processing server storage unit 310. The information processing server processor 300 is a processor that is a CPU, an MPU, or the like and executes a program. The information processing server controller 30 controls each of the units of the information processing server 3 by causing the information processing server processor 300 to read and execute a control program stored in the information processing server storage unit 310. The information processing server controller 30 executes the control program stored in the information processing server storage unit 310, thereby functioning as a database processing unit 301, a receiver 302, a transmitter 303, a print data generator 304, an identifying unit 305, a data set generator 306, a learning unit 307, an input and output processing unit 308, and a display data processing unit 309.

The information processing server storage unit 310 corresponds to an example of a storage unit and an example of an association information storage unit. The receiver 302 corresponds to an example of an acquirer. The input and output processing unit 308 corresponds to an example of a processing unit.

The information processing server storage unit 310 includes a memory that stores the program to be executed by the information processing server processor 300 and data to be processed by the information processing server processor 300. The information processing server storage unit 310 stores the control program to be executed by the information processing server processor 300, a student management DB 311, a related information management DB 312, a keyword management DB 313, a data set management DB 314, a learning model 315, and other various data. The information processing server storage unit 310 has a nonvolatile storage region. The information processing server storage unit 310 may have a volatile storage region that constitutes a work area of the information processing server processor 300.

Figure 3:
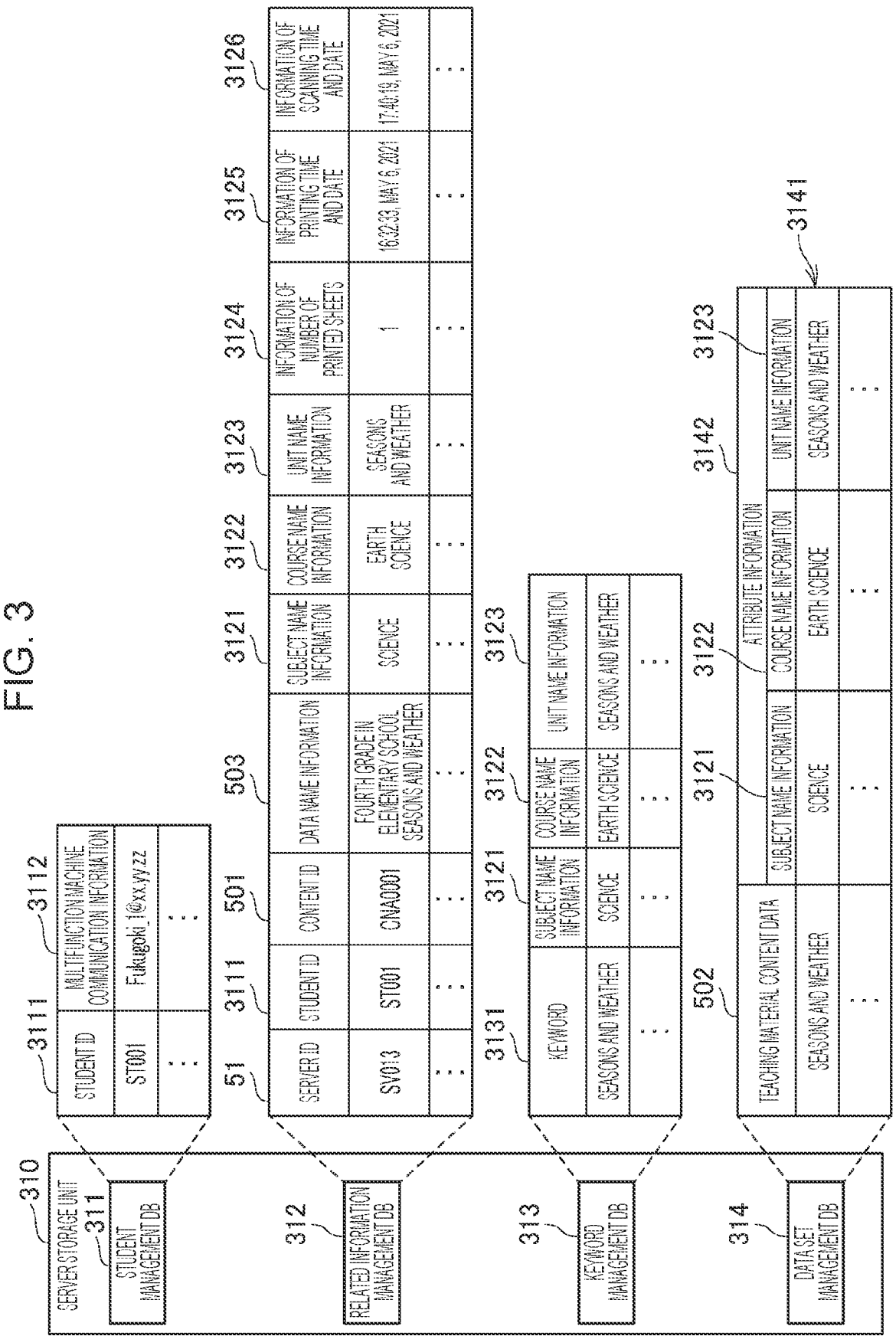
FIG. 3 is a diagram illustrating an example of each of databases stored in an information processing server storage unit.

FIG. 3 is a diagram illustrating an example of each of the databases stored in the information processing server storage unit 310.

The student management DB 311 is a database that manages information on the student P1. A record stored in the student management DB 311 includes a student ID 3111 and multifunction machine communication information 3112.

The student ID 3111 is identification information identifying the student P1. A student ID 3111 is appropriately assigned to each student P1 in advance.

The multifunction machine communication information 3112 is information for communication with the multifunction machine 1. For example, when an individual electronic mail address is given to the multifunction machine 1, the multifunction machine communication information 3112 indicates the electronic mail address.

The related information management DB 312 is a database that manages information on the teaching material content KC delivered by the teaching material content providing server 5 to the student P1. A record stored in the related information management DB 312 includes the server ID 51, the student ID 3111, the content ID 501, the data name information 503, subject name information 3121, course name information 3122, unit name information 3123, information 3124 of the number of printed sheets, information 3125 of a printing time and date, and information 3126 of a scanning time and date.

In the following description, a record stored in the related information management DB 312 is referred to as "related information record". The related information record corresponds to an example of association information.

The subject name information 3121 indicates a subject name of the teaching material content KC.

The course name information 3122 indicates a course name of the teaching material content KC. In the present embodiment, the course is categorized in a narrower sense than the subject in terms of learning contents.

The unit name information 3123 indicates a unit name of the teaching material content KC. In the present embodiment, the unit is categorized in a narrower sense than the course in terms of learning contents.

The information 3124 of the number of printed sheets is information indicating the number of teaching material content printed sheets IB.

The information 3125 of the printing time and date indicates the time and date when print data generated by the print data generator 304 described later is transmitted.

The information 3126 of the scanning time and date indicates the time and date when the receiver 302 described later receives read data from the multifunction machine 1.

The keyword management DB 313 is a database that manages information on a keyword 3131 to be used by the identifying unit 305 to perform a keyword search. A record stored in the keyword management DB 313 includes the keyword 3131, the subject name information 3121, the course name information 3122, and the unit name information 3123. Association relationships between the keyword 3131, the subject name information 3121, the course name information 3122, and the unit name information 3123 in the record are appropriately set in advance.

The data set management DB 314 is a database that stores a data set 3141 as a record. The data set 3141 is data in which the teaching material content data 502 is associated with attribute information 3142. In the present embodiment, the attribute information 3142 includes the subject name information 3121, the course name information 3122, and the unit name information 3123. Therefore, an attribute indicated by the attribute information 3142 described in the present embodiment is the subject name, the course name, and the unit name.

Returning to FIG. 2, the learning model 315 stored in the information processing server storage unit 310 is a machine-learned model based on the data set 3141 stored in the data set management DB 314. The teaching material content data 502 is input to the learning model 315 and the attribute information 3142 is output from the learning model 315. The learning model 315 is configured as a program that is executed by the input and output processing unit 308. For example, as the learning model 315, a model such as a neural network or a support vector machine is used.

The information processing server communication unit 31 is a communication interface having a wireless circuit, an antenna, and the like and communicates with a device connected to the global network GN in accordance with the predetermined communication standard.

As described above, the information processing server controller 30 functions as the database processing unit 301, the receiver 302, the transmitter 303, the print data generator 304, the identifying unit 305, the data set generator 306, the learning unit 307, the input and output processing unit 308, and the display data generator 309.

The database processing unit 301 generates and stores a record and updates information of the record for each of the databases stored in the information processing server storage unit 310.

The receiver 302 acquires the teaching material content data 502 from the teaching material content providing server 5. Specifically, the receiver 302 receives print request information from the teaching material content providing server 5 via the information processing server communication unit 31. The print request information is information that requests to generate a teaching material content printed sheet IB. The print request information received by the receiver 302 includes the server ID 51 of the teaching material content providing server 5 that is a source of the print request information, the student ID 3111, the content ID 501, the teaching material content data 502, and the data name information 503.

In addition, the receiver 302 receives read data from the multifunction machine 1 via the information processing server communication unit 31.

The transmitter 303 transmits print data generated by the print data generator 304 described below to the multifunction machine 1 via the information processing server communication unit 31.

The print data generator 304 generates the print data based on the teaching material content data 502 included in the print request information received by the receiver 302. The print data generated by the print data generator 304 is data to be processed by the multifunction machine 1 for printing and includes various control commands conforming to a command system of the multifunction machine 1.

The identifying unit 305 identifies category names into which the learning contents of the teaching material content KC received by the receiver 302 are categorized. The identifying unit 305 identifies the subject name, the course name, and the unit name as the category names from the data name of the teaching material content KC.

The data set generator 306 generates the data set 3141 that is data to be used by the learning unit 307 to perform learning. The data set generator 306 generates the attribute information 3142 including the subject name information 3121 indicating the subject name identified by the identifying unit 305, the course name information 3122 indicating the course name identified by the identifying unit 305, and the unit name information 3123 indicating the unit name identified by the identifying unit 305. Next, the data set generator 306 acquires the teaching material content data 502 of the teaching material content KC for which the identifying unit 305 has identified the subject name, the course name, and the unit name. Then, the data set generator 306 generates the data set 3141 in which the generated attribute information 3142 is associated with the acquired teaching material content data 502. After the data set generator 306 generates the data set 3141, the database processing unit 301 stores, in the data set management DB 314, the data set 3141 generated by the data set generator 306.

The learning unit 307 is artificial intelligence (AI) and is constituted by software or hardware. The learning unit 307 uses the data set 3141 stored in the data set management DB 314 to perform machine learning, thereby updating the learning model 315 stored in the information processing server storage unit 310. That is, the learning unit 307 performs the learning using the data set 3141 to update the learning model 315 such that a result of the learning is reflected in the learning model 315. In the present embodiment, since the learning unit 307 performs the learning using the data set 3141, the learning can be implemented as supervised learning. The learning unit 307 performs the machine learning using the attribute information 3142 as a label in the data set 3141 to learn which subject name, course name, and unit name are indicated by the attribute information 3142 corresponding to features of the teaching material content KC indicated by the input teaching material content data 502. The features of the teaching material content KC are, for example, the presence or absence of a picture, a character or a character string in a document, the presence or absence of a mathematical expression, the amount of a text, and the like.

The learning unit 307 updates the learning model 315 stored in the information processing server storage unit 310 when a predetermined time elapses, or when a new data set 3141 is stored in the data set management DB 314, or the like. The data set 3141 used for the learning may be deleted from the data set management DB 314.

The input and output processing unit 308 inputs the teaching material content data 502 included in the print request information received by the receiver 302 to the learning model 315 and causes the attribute information 3142 to be output from the learning model 315.

The display data processing unit 309 generates display data that causes a learning state screen JG indicating the state of the learning to be displayed. In the following description, the display data is referred to as "learning state screen display data". The display data processing unit 309 transmits the learning state screen display data to the terminal device 4 via the information processing server communication unit 31.

Next, an operation of the information processing system 1000 is described.

First, an operation up to the generation of a teaching material content printed sheet IB by the multifunction machine 1 is described.

Figure 4:
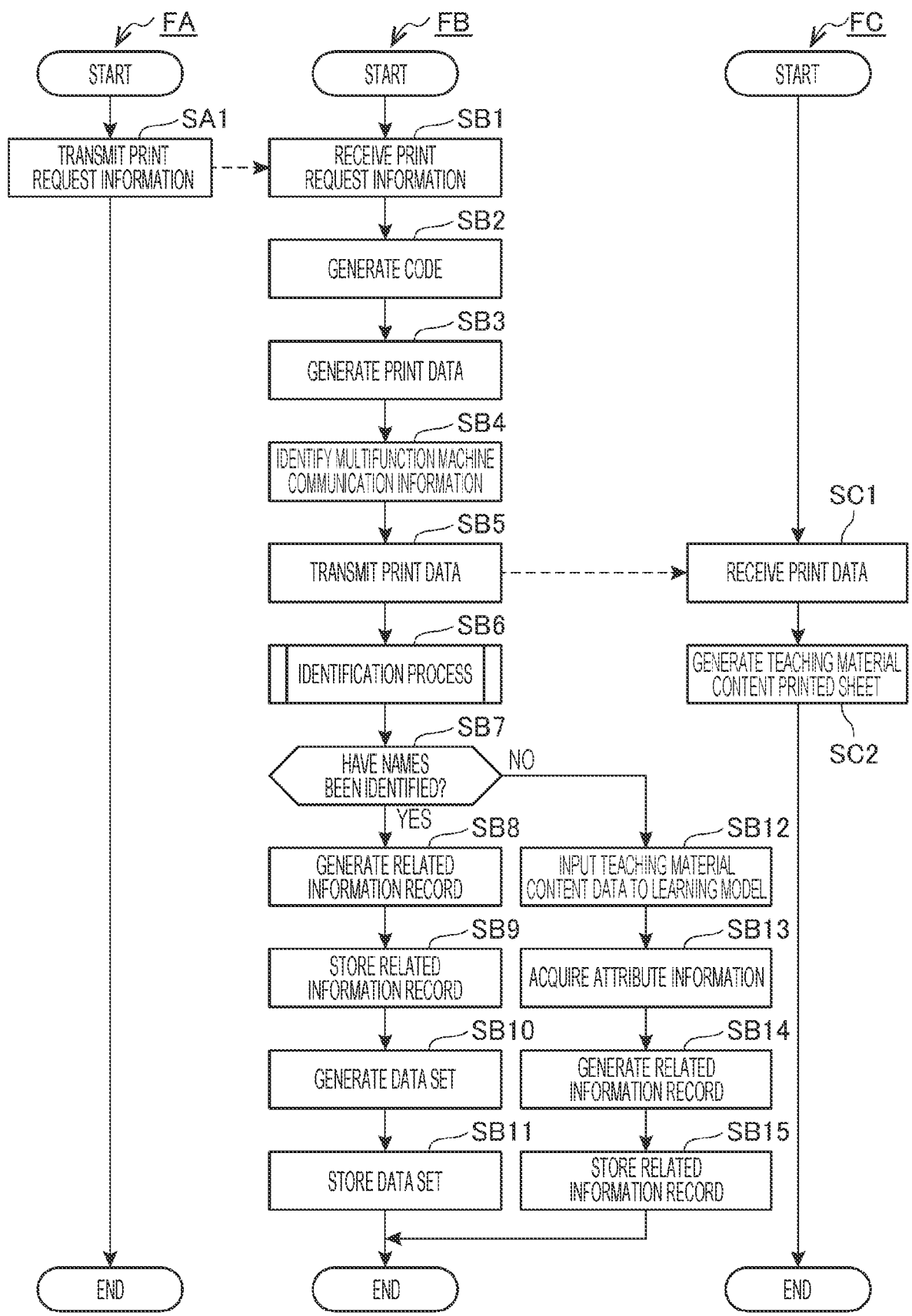
FIG. 4 is a flowchart illustrating an operation of the information processing system.

FIG. 4 is a flowchart illustrating the operation of the information processing system 1000.

In FIG. 4, a flowchart FA indicates an operation of the teaching material content providing server 5, a flowchart FB indicates an operation of the information processing server 3, and a flowchart FC indicates an operation of the multifunction machine 1.

The teaching material content providing server 5 transmits print request information to the information processing server 3 (step SA1). The print request information includes the student ID 3111, the content ID 501, the teaching material content data 502 associated with the content ID 501, and the data name information 503 associated with the content ID 501.

For example, in step SA1, the teaching material content providing server 5 transmits the print request information upon receiving, from the terminal device 4 or the information processing server 3, content-specified information specifying the teaching material content KC to be delivered to the student P1. The content-specified information includes the student ID 3111 of the student P1 who is the delivery destination. The print request information transmitted in this case includes the student ID 3111 of the student P1 who is the delivery destination, the content ID 501 of the teaching material content KC specified by the content-specified information, and the teaching material content data 502 and the data name information 503 that are associated with the content ID 501.

The receiver 302 of the information processing server 3 receives the print request information from the teaching material content providing server 5 (step SB1).

The print data generator 304 generates a code CD indicating the content ID 501 and the student ID 3111 that are included in the print request information (step SB2). The code CD is a code such as a barcode or a QR code, which is a registered trademark.

Next, the print data generator 304 generates print data (step SB3). The print data generated in step SB3 is data for printing the teaching material content KC indicated by the teaching material content data 502 included in the print request information received in step SB1 and the code CD generated in step SB2.

The transmitter 303 identifies, from the student management DB 311, the multifunction machine communication information 3112 associated with the student ID 3111 included in the print request information received in step SB1 (step SB4).

Next, the transmitter 303 transmits the print data generated by the print data generator 304 in step SB3 to the multifunction machine 1 via the information processing server communication unit 31 based on the multifunction machine communication information 3112 identified in step SB4 (step SB5).

As indicated by the flowchart FC, the multifunction machine communication controller 101 of the multifunction machine 1 receives the print data from the information processing server 3 via the multifunction machine communication unit 11 (step SC1).

Next, the print controller 102 causes the printing unit 12 to perform printing based on the print data received by the multifunction machine communication controller 101 so as to generate a teaching material content printed sheet IB (step SC2).

Returning to the description of the flowchart FB, the identifying unit 305 of the information processing server 3 performs an identification process of identifying a category name (step SB6).

Figure 5:
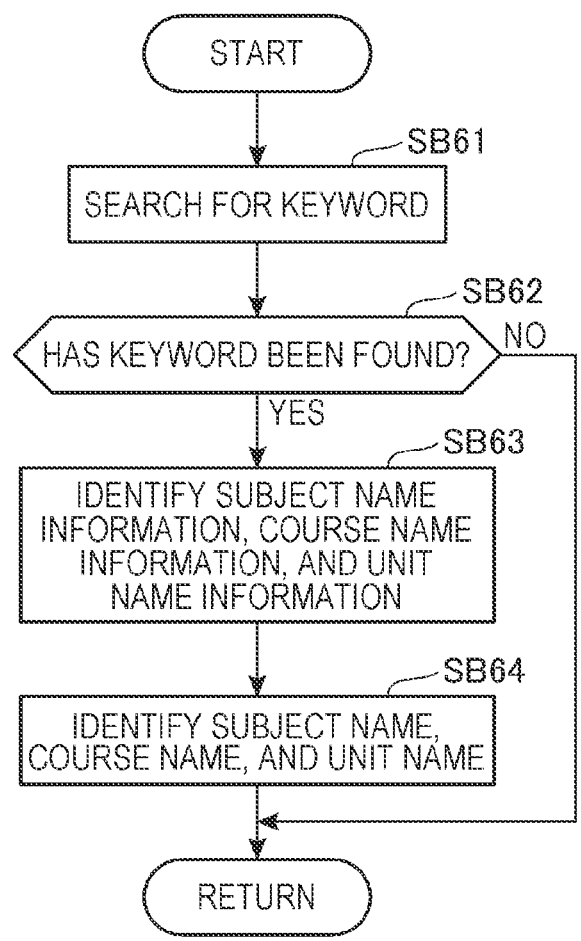
FIG. 5 is a flowchart illustrating an operation of an identifying unit in an identification process.

FIG. 5 is a flowchart illustrating an operation of the identifying unit 305 in the identification process.

The identifying unit 305 performs a keyword search to search for a keyword for the data name indicated by the data name information 503 included in the print request information received in step SB1 (step SB61). In the keyword search of step SB61, the identifying unit 305 searches for the keyword 3131 stored in the keyword management DB 313 from the data name.

The identifying unit 305 determines whether the identifying unit 305 has found the keyword 3131 from the data name in the keyword search (step SB62).

When the identifying unit 305 determines that the identifying unit 305 has found the keyword 3131 in the keyword search (YES in step SB62), the identifying unit 305 identifies, from the keyword management DB 313, the subject name information 3121, the course name information 3122, and the unit name information 3123 that are associated with the found keyword 3131 (step SB63).

Next, the identifying unit 305 identifies the subject name indicated by the subject name information 3121 identified in step SB63, the course name indicated by the course name information 3122 identified in step SB63, and the unit name identified by the unit name information 3123 identified in step SB63 as the subject name, the course name, and the unit name of the teaching material content KC acquired by the receiver 302 (step SB64).

Returning to the description of the flowchart FB illustrated in FIG. 4, the identifying unit 305 of the information processing server 3 determines whether the identifying unit 305 has identified the subject name, the course name, and the unit name in the identification process of step SB6 (step SB7).

When the identifying unit 305 determines that the identifying unit 305 has identified the subject name, the course name, and the unit name in the identification process (YES in step SB7), the database processing unit 301 generates a related information record (step SB8).

In step SB8, the database processing unit 301 causes the server ID 51, the student ID 3111, and the data name information 503, which are included in the print request information received in step SB1, to be included in the related information record. In addition, the database processing unit 301 causes the subject name information 3121, the course name information 3122, and the unit name information 3123, which have been identified in step SB8, to be included in the related information record. Furthermore, the database processing unit 301 causes the information 3124 of the number of printed sheets, which indicates the number of teaching material content printed sheets IB generated based on the print data generated by the print data generator 304, to be included in the related information record. Furthermore, the database processing unit 301 causes the information 3125 of the printing time and date, which indicate the time and date when the transmitter 303 transmitted the print data, to be included in the related information record.

After generating the related information record, the database processing unit 301 causes the generated related information record to be stored in the related information management DB 312 (step SB9). Information 3126 of a scanning time and date that is included in the related information record when the related information record is stored in step SB9 is blank and does not indicate any time and date.

Next, the data set generator 306 generates a data set 3141 (step SB10). Attribute information 3142 of the data set 3141 generated in step SB10 includes the subject name information 3121 indicating the subject name identified by the identifying unit 305 in the identification process, the course name information 3122 indicating the course name identified by the identifying unit 305 in the identification process, and the unit name information 3123 indicating the unit name identified by the identifying unit 305 in the identification process. In addition, teaching material content data 502 of the data set 3141 generated in step SB10 is the teaching material content data 502 included in the print request information received in step SB1.

Next, the database processing unit 301 causes the data set 3141 generated by the data set generator 306 to be stored in the data set management DB 314 (step SB11).

Returning to the description of step SB7, when the identifying unit 305 determines that the identifying unit 305 has not identified the subject name, the course name, and the unit name in the identification process (NO in step SB7), the input and output processing unit 308 inputs the teaching material content data 502 included in the print request information received in step SB1 to the learning model 315 (step SB12).

Next, the input and output processing unit 308 acquires the attribute information 3142 output from the learning model 315 (step SB13).

Then, the database processing unit 301 generates a related information record (step SB14).

In step SB14, the database processing unit 301 causes the server ID 51, the student ID 3111, and the data name information 503, which are included in the print request information received in step SB1, to be included in the related information record. In addition, the database processing unit 301 causes the subject name information 3121, the course name information 3122, and the unit name information 3123, which are included in the attribute information 3142 acquired in step SB13, to be included in the related information record. Furthermore, the database processing unit 301 causes the information 3124 of the number of printed sheets, which indicates the number of teaching material content printed sheets IB generated based on the print data generated by the print data generator 304, to be included in the related information record. Furthermore, the database processing unit 301 causes the information 3125 of the printing time and date, which indicate the time and date when the transmitter 303 transmitted the print data, to be included in the related information record.

After generating the related information record, the database processing unit 301 causes the generated related information record to be stored in the related information management DB 312 (step SB14). Information 3126 of a scanning time and date that is included in the related information record when the related information record is stored in step SB14 is blank and does not indicate any time and date.

The foregoing identifying unit 305 is configured to identify the subject name, the course name, and the unit name in the keyword search based on the keyword management DB 313. However, a method for identifying the attribute by the identifying unit 305 is not limited to the keyword search.

The identifying unit 305 may identify, based on the related information record stored in the related information management DB 312, the subject name, the course name, and the unit name from the data name indicated by the data name information 503 included in the print request information received by the receiver 302. For example, the identifying unit 305 identifies the unit name from a character string forming the data name and identifies, from the related information management DB 312, the related information record having the unit name information 3123 indicating the identified unit name. The identifying unit 305 identifies the subject name, the course name, and the unit name of the teaching material content KC acquired by the receiver 302 based on the subject name information 3121, the course name information 3122, and the unit name information 3123 that are included in the identified related information record. When the keyword has not been found in the keyword search, the identifying unit 305 performs the identification based on the related information record, instead of the keyword search. When the identifying unit 305 has not identified the subject name, the course name, and the unit name based on the related information record, the input and output processing unit 308 causes the attribute information 3142 to be output from the learning model 315.

Next, an operation of the information processing system 1000 when a teaching material content printed sheet IB with a question already answered is scanned by the multifunction machine 1 is described.

Figure 6:
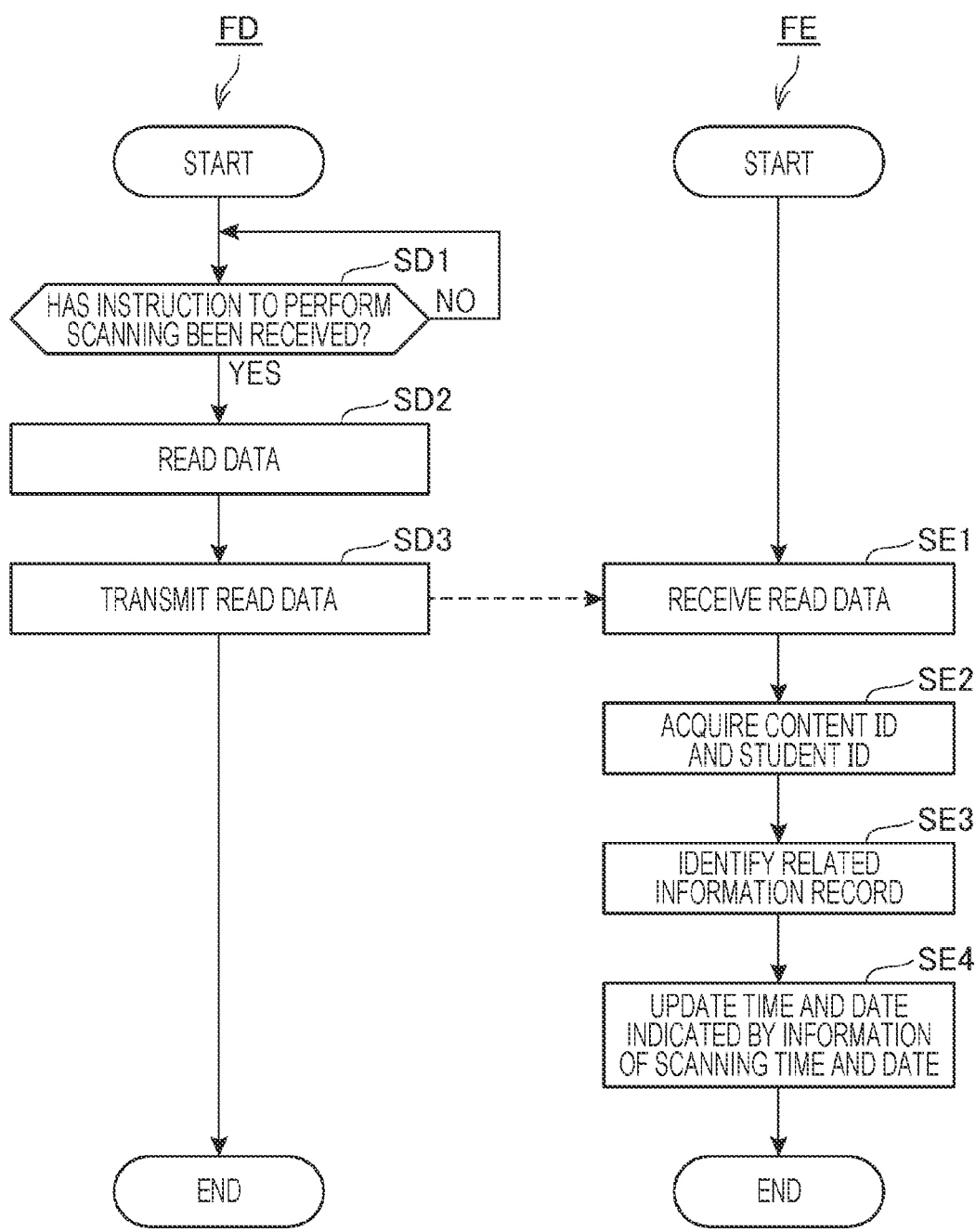
FIG. 6 is a flowchart illustrating an operation of the information processing system.

FIG. 6 is a flowchart illustrating the operation of the information processing system 1000.

In FIG. 6, a flowchart FD indicates an operation of the multifunction machine 1 and a flowchart FE indicates an operation of the information processing server 3.

At the start time of the flowchart FD illustrated in FIG. 6, a teaching material content printed sheet IB with an answer written by the student P1 is already set on the multifunction machine 1.

The scan controller 103 of the multifunction machine 1 determines whether the scan controller 103 has received an instruction to perform scanning (step SD1).

When the scan controller 103 determines that the scan controller 103 has received the instruction to perform scanning (YES in step SD1), the scanning unit 13 scans a printed surface of the set teaching material content printed sheet IB to read data (step SD2).

The multifunction machine communication controller 101 transmits the data read in step SD2 to the information processing server 3 via the multifunction machine communication unit 11 (step SC3).

As indicated by the flowchart FE, the receiver 302 of the information processing server 3 receives the read data from the multifunction machine 1 via the information processing server communication unit 31 (step SE1).

Next, the database processing unit 301 acquires the content ID 501 and the student ID 3111 from the code CD indicated by the received read data and included in an image on the printed surface of the teaching material content printed sheet IB (step SE2).

Next, the database processing unit 301 identifies, from the related information management DB 312, a related information record including a combination of the acquired content ID 501 and the acquired student ID 3111 (step SE3).

Next, the database processing unit 301 updates a time and date indicated by information 3126 indicating a scanning time and date and included in the identified related information record to the time and date when the read data was received (step SE4).

Next, an operation of the information processing system 1000 in the case where the learning state screen JG is displayed by the terminal device 4 is described.

Figure 7:
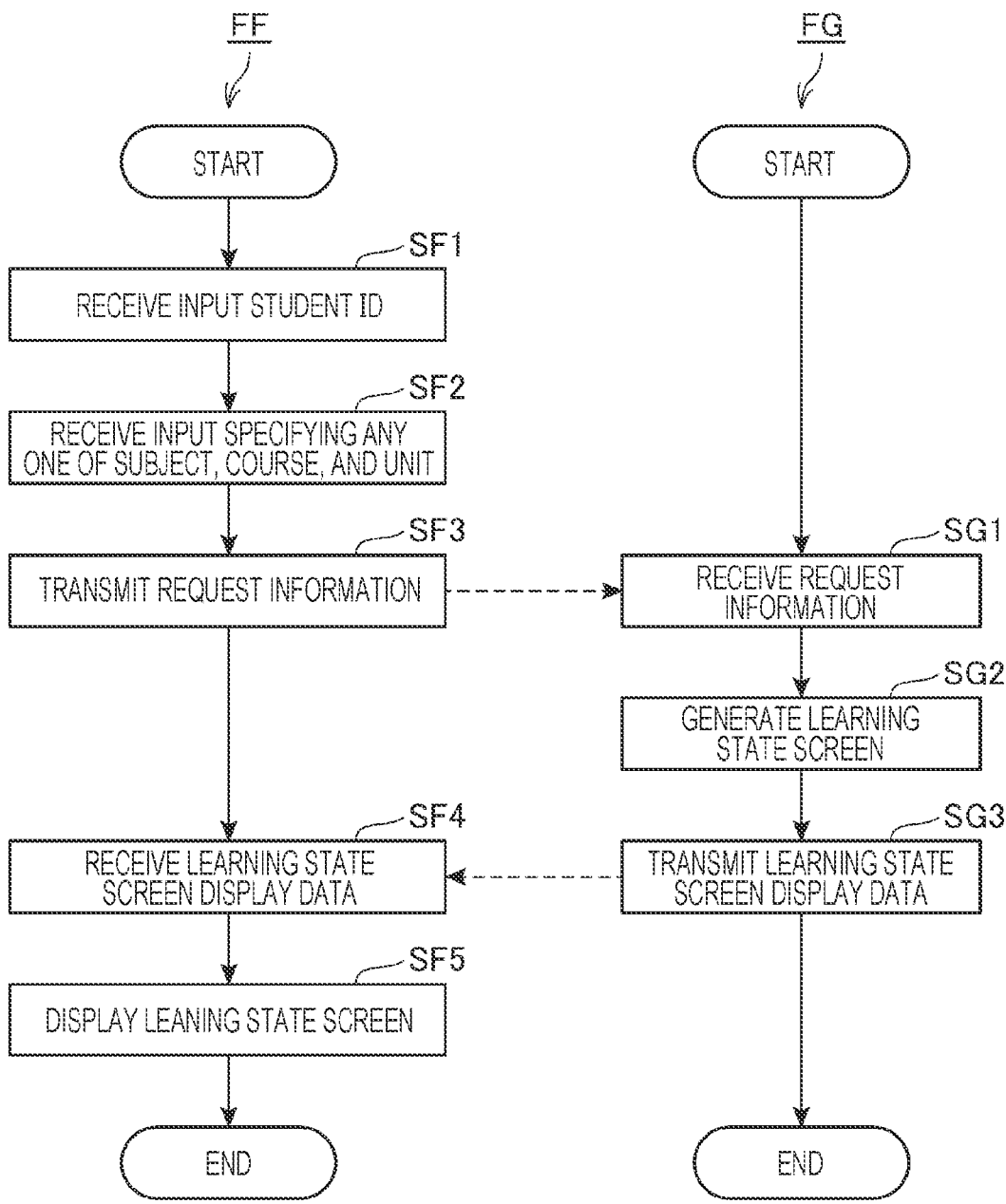
FIG. 7 is a flowchart illustrating an operation of the information processing system.

FIG. 7 is a flowchart illustrating the operation of the information processing system 1000.

In FIG. 7, a flowchart FF indicates an operation of the terminal device 4 and a flowchart FG indicates an operation of the information processing server 3.

As indicated by the flowchart FF, the browser executor 401 of the terminal device 4 receives the input student ID 3111 via the input unit 43 (step SF1).

Next, the browser executor 401 receives input specifying any one of the subject, the course, and the unit (step SF2).

Next, the browser executor 401 transmits request information that requests the learning state screen display data to the information processing server 3 via the terminal communication unit 41 (step SF3).

The request information transmitted in step SF2 includes the input student ID 3111 and category-specified information indicating the specified one of the subject, the course, and the unit.

As indicated by the flowchart FG, the display data processing unit 307 of the information processing server 3 receives the request information from the terminal device 4 via the information processing server communication unit 31 (step SG1).

Next, the display data processing unit 307 generates the learning state screen JG based on the student ID 3111 and the category-specified information that are included in the request information (step SG2).

Figure 8:
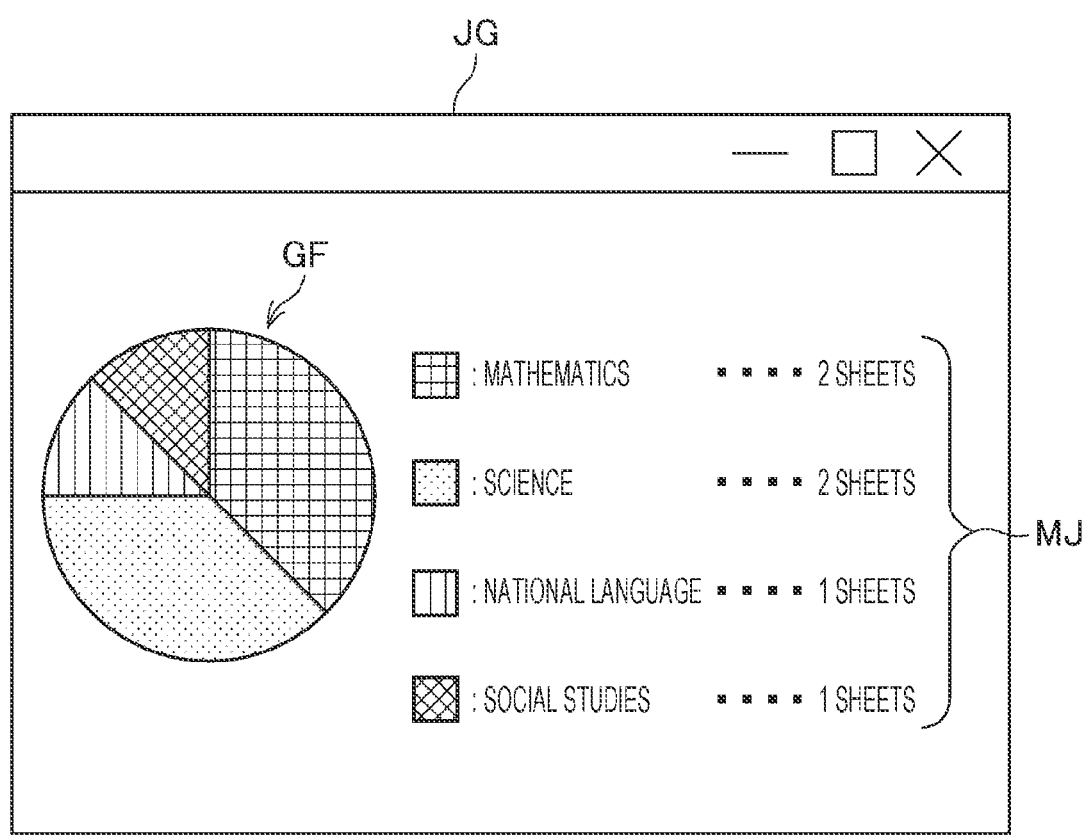
FIG. 8 is a diagram illustrating an example of a learning state screen.

FIG. 8 is a diagram illustrating an example of the learning state screen JG.

The learning state screen JG illustrated in FIG. 8 indicates an example of the learning state screen JG when the category-specified information included in the request information indicates subjects.

The learning state screen JG illustrated in FIG. 8 indicates a learning state for each of the subjects. The learning state indicates how many teaching material content printed sheets IB have been used by the student P1 to do learning.

The learning state screen JG illustrated in FIG. 8 includes a pie chart GF and information MJ of the numbers of printed sheets. The pie chart GF indicates how many teaching material content printed sheets IB have been used for each of the subjects with respect to the total number of teaching material content printed sheets IB used by the student P1 to do learning. The information MJ of the numbers of printed sheets indicates how many teaching material content printed sheets IB have been used by the student P1 for each of the subjects.

The display data processing unit 309 generates the learning state screen JG illustrated in FIG. 8 by performing the following process.

That is, the display data processing unit 309 identifies, from the related information management DB 312, all related information records including the student ID 3111 included in the request information. Next, the display data processing unit 307 calculates the total number of printed sheets that is indicated by the information 3124 indicating the numbers of printed sheets and included in the identified related information records. Next, the display data processing unit 309 calculates the total number of printed sheets for each of the subjects based on the subject name information 3121 included in the identified related information records and the information 3124 indicating the numbers of printed sheets and included in the identified related information records. Then, the display data processing unit 309 generates the learning state screen JG based on each of the calculated total numbers of printed sheets.

The learning state screen JG illustrated in FIG. 8 is an example. The learning state screen JG may indicate the number of printed sheets for each of the subjects with respect to the total number of printed sheets in a graph that is not the pie chart GF and is a bar graph or the like. In addition, the learning state screen JG is not limited to the screen indicating how many teaching material content printed sheets IB have been used for each of the subjects. The learning state screen JG may indicate, as the learning state, the number of teaching material content printed sheets IB for each course or for each unit based on the category-specified information included in the request information.

Returning to the description of the flowchart illustrated in FIG. 7, the display data processing unit 309 transmits the learning state screen display data of the generated learning state screen JG to the terminal device 4 via the information processing server communication unit 31 (step SG3).

As indicated by the flowchart FF, the browser executor 401 of the terminal device 4 receives the learning state screen display data via the terminal communication unit 41 (step SF4).

Next, the browser executor 401 causes the display unit 42 to display the learning state screen JG based on the received learning state screen display data (step SF5).

In the foregoing embodiment, the identifying unit 305 is configured to identify the subject name, the course name, and the unit name. However, the identifying unit 305 may be configured to identify a category name, which is at least one of the subject name, the course name, and the unit name. In this configuration, the related information record stored in the related information management DB 312 includes information indicating the category name identified by the identifying unit 305. For example, when the identifying unit 305 is configured to identify only the unit name, the related information record stored in the related information management DB 312 includes the unit name information 3123 and does not include the subject name information 3121 and the course name information 3122.

In the foregoing embodiment, the input and output processing unit 308 is configured to input the teaching material content data 502 to the learning model 315 and cause the attribute information 3142 to be output from the learning model 315. However, the attribute information 3142 output from the learning model 315 by the input and output processing unit 308 may include at least one of the subject name information 3121, the course name information 3122, and the unit name information 3123. In this configuration, the data set generator 306 generates a data set 3141 in which the teaching material content data 502 is associated with the attribute information 3142 including at least one of the subject name information 3121, the course name information 3122, and the unit name information 3123. In this configuration, the teaching material content data 502 is input to the learning model 315 and the attribute information 3142 included in this data set 3141 is output from the learning model 315. In this configuration, the learning unit 307 performs the learning using the data set 3141 and updates the learning model 315 such that a result of the learning is reflected in the learning model 315.

The foregoing embodiment exemplifies the subject name, the course name, and the unit name as the attribute of the teaching material content KC. However, the attribute of the teaching material content KC is not limited to the subject name, the course name, and the unit name, and may include other attributes such as a target grade and a theme as well as or instead of at least one of the subject name, the course name, and the unit name. In this configuration, the identifying unit 305 identifies the other attributes of the teaching material content KC by performing the keyword search based on the data name. Then, when the identifying unit 305 has not identified the other attributes, the input and output processing unit 308 inputs the teaching material content data 502 to the learning model 315 and causes the attribute information 3142 indicating the other attributes of the teaching material content KC to be output from the learning model 315. This learning model 315 is a machine-learned model based on the data set 3141 in which the attribute information 3142 including the other attributes is associated with the teaching material content data 502. In this configuration, the data set generator 306 generates the data set 3141 in which the attribute information 3142 including the other attributes is associated with the teaching material content data 502.

In addition, in this configuration, the related information record may further include information indicating the other attributes such as the target grade and the theme. In this configuration, it is possible to provide a different type of learning state screen JG. For example, it is possible to provide a learning state screen JG indicating which grade the teaching material content KC was used by each student P1 to do learning. In addition, for example, it is possible to provide a learning state screen JG indicating how difficult the learning was for each student P1 and for each theme based on a database including a learning difficulty level for each theme.

As described above, the information processing server 3 includes the information processing server storage unit 310 that stores the machine-learned learning model 315 based on the data set 3141 in which the teaching material content data 502 is associated with the attribute information 3142 indicating the attribute of the teaching material content KC, the receiver 302 that acquires the teaching material content data 502, and the input and output processing unit 308 that inputs the teaching material content data 502 acquired by the receiver 302 to the learning model 315 stored in the information processing server storage unit 310 and causes the attribute information 3142 to be output from the learning model 315. The information processing server storage unit 310 stores the related information record in which the teaching material content data 502 acquired by the receiver 302 is associated with the attribute information 3142 output from the learning model 315 by the input and output processing unit 308.

In addition, a method for controlling the information processing server 3 includes storing the machine-learned learning model 315 based on the data set 3141 in which the teaching material content data 502 is associated with the attribute information 3142 indicating the attribute of the teaching material content KC, acquiring the teaching material content data 502, inputting the acquired teaching material content data 502 to the learning model 315 stored in the information processing server storage unit 310 and outputting the attribute information 3142 from the learning model 315, and storing the related information record in which the acquired teaching material content data 502 is associated with the attribute information 3142 output from the learning model 315 by the input and output processing unit 308.

The information processing server 3 and the method for controlling the information processing server 3 can easily define the attribute of the teaching material content KC by using the machine-learned learning model 315 based on the data set 3141 in which the teaching material content data 502 is associated with the attribute information 3142, even when other information is not added to the teaching material content data 502. In addition, the information processing server 3 and the method for controlling the information processing server 3 can associate an appropriate attribute with the teaching material content KC and manage the teaching material content KC by using the learning model 315.

In addition, the information processing server 3 includes the learning unit 307 that acquires the data set 3141 in which the teaching material content data 502 is associated with the attribute information 3142 indicating the attribute of the teaching material content KC, and performs the machine learning based on the data set 3141, and the information processing server storage unit 310 that stores the machine-learned learning model 315.

The information processing server 3 can easily define the attribute of the teaching material content KC by using the machine-learned learning model 315 based on the data set 3141 in which the teaching material content data 502 is associated with the attribute information 3142, even when other information is not added to the teaching material content data 502. In addition, the information processing server 3 and the method for controlling the information processing server 3 can associate an appropriate attribute with the teaching material content KC and manage the teaching material content KC by using the learning model 315.

The information processing server 3 includes the identifying unit 305 that identifies, based on the related information record, the attribute of the teaching material content KC from the data name of the teaching material content data 502 acquired by the receiver 302.

According to this, it is possible to identify the attribute of the teaching material content KC using the attribute information 3142 output from the learning model 315. Therefore, it is possible to define the attribute of the teaching material content KC without unnecessarily using the learning model 315.

The information processing server 3 includes the identifying unit 305 that identifies the attribute of the teaching material content KC from the data name of the teaching material content data 502 acquired by the receiver 302. When the identifying unit 305 does not identify the attribute of the teaching material content KC, the input and output processing unit 308 inputs the teaching material content data 502 acquired by the receiver 302 to the learning model 315 stored in the information processing server storage unit 310, causes the attribute information 3142 to be output from the learning model 315, and causes the related information record to be stored in the related information management DB 312.

The data name of the teaching material content data 502 may include a character or a character string that indicates the attribute that is the subject name, the course name, and the unit name, or the like. In this case, the data name is given by a person who created the teaching material content KC. Therefore, it is highly probable that the attribute of the teaching material content KC that is included in the data name is accurate as the attribute of the teaching material content KC. When the identifying unit 305 identifies the attribute information 3142, the input and output processing unit 308 does not need to use the learning model 315 to acquire the attribute information 3142. Therefore, it is possible to easily define the attribute of the teaching material content KC without unnecessarily using the learning model 315, associate an appropriate attribute with the teaching material content KC, and manage the teaching material content KC.

The information processing server 3 includes the learning unit 307 that acquires the data set 3141 and updates the learning model 315 stored in the information processing server storage unit 310 based on the acquired data set 3141.

According to this, since the learning model 315 is updated by additionally learning the data set 3141, it is possible to more accurately define the attribute of the teaching material content KC using the learning model 315 after the update.

The information processing server 3 includes the identifying unit 305 that identifies the attribute of the teaching material content KC from the data name of the teaching material content data 502 acquired by the receiver 302. The data set 3141 includes the teaching material content data 502 from which the identifying unit 305 identified the attribute of the teaching material content KC, and the attribute information 3142 indicating the attribute of the teaching material content KC identified by the identifying unit 305.

As described above, the data name of the teaching material content data 502 may include a character or a character string that indicates the attribute that is the subject name, the course name, and the unit name, or the like. In this case, the data name is given by the person who created the teaching material content KC. Therefore, it is highly probable that the attribute of the teaching material content KC that is included in the data name is accurate as the attribute of the teaching material content KC. By treating the attribute information 3142 included in the data set 3141 as information indicating the attribute identified by the identifying unit 305, the learning unit 307 can perform the learning to obtain more accurate attribute information 3142. Therefore, the information processing server 3 can more accurately define the attribute of the teaching material content KC.

The information processing server 3 is connected to the teaching material content providing server 5. The receiver 302 acquires the teaching material content data 502 from the teaching material content providing server 5.

According to this configuration, it is possible to easily define the attribute of the teaching material content KC managed by the separate server, associate an appropriate attribute with the teaching material content KC, and manage the teaching material content KC.

The information processing server 3 is connected to the multifunction machine 1 of the student P1. The information processing server 3 includes the transmitter 303 that transmits, to the multifunction machine 1, print data including the teaching material content data 502 acquired by the receiver 302.

According to this configuration, it is possible to easily define the attribute of the teaching material content KC that is used by the student P1 for learning, associate an appropriate attribute with the teaching material content KC, and manage the teaching material content KC.

The attribute of the teaching material content KC is at least one of the subject name, the course name, and the unit name.

According to this configuration, it is possible to easily define at least one of the subject name, the course name, and the unit name for the teaching material content KC.

The foregoing embodiment is an aspect of the present disclosure and can be arbitrarily modified and applied within the scope of the present disclosure.

In the foregoing embodiment, the related information management DB 312 and the learning model 315 are stored in the information processing server storage unit 310. However, the related information management DB 312 and the learning model 315 may be stored in different storage regions. In this case, a storage region in which the related information management DB 312 is stored corresponds to an example of the association information storage unit, and a storage region in which the learning model 315 is stored corresponds to an example of the storage unit.

The foregoing embodiment exemplifies the information processing server 3 as the learning device. However, the learning device is not limited to the information processing server 3. The learning device may be a device that is included in the information processing server 3, stores the learning model 315 and the related information record, and uses the learning model 315 to output the attribute information 3142. In addition, the learning device may be a device that is separated from the information processing server 3, stores the learning model 315 and the related information record, and uses the learning model 315 to output the attribute information 3142. In this case, the learning device receives the teaching material content data 502 from the information processing server 3 or the teaching material content providing server 5 and performs the processes on the received teaching material content data 502.

The foregoing embodiment exemplifies the content ID 501 as the identification information of the teaching material content KC. However, the identification information of the teaching material content KC is not limited to the content ID 501 and may be a data name.

In the foregoing embodiment, the number of teaching material content providing servers 5 connected to the information processing server 3 is 1, but may be two or more.

The foregoing embodiment exemplifies the student P1 as the learner. The learner is not limited to the student P1. It is sufficient if the learner uses the teaching material content KC to do learning. For example, the learner may be an employee who works for a company, or the like. In addition, the embodiment exemplifies the teacher P2 as the user of the terminal device 4. The user of the terminal device 4 is not limited to the teacher P2. It is sufficient if the user of the terminal device 4 is a person involved who has a predetermined relationship with the learner. For example, when the learner is an employee who works for a company, the user of the terminal device 4 may be a supervisor of the employee or may be another employee involved in personnel.

The foregoing embodiment exemplifies the serial ink jet method as the printing method of the multifunction machine 1. However, the printing method of the multifunction machine 1 may be a line ink jet method. The printing method of the multifunction machine 1 is not limited to the ink jet method and may be another printing method such as an electrophotographic method using toner. Although the multifunction machine 1 is exemplified as the printing device, the printing device is not limited to the multifunction machine 1 and may be a printing device such as a printer that does not have a scanning function. In this case, an external device having a scanning function is connected to the printing device, and the printing device performs reading via the external device connected. The multifunction machine 1 may be a device further having various functions such as a facsimile function.

The functions of the multifunction machine controller 10, the information processing server controller 30, and the terminal controller 40 may be implemented as a plurality of processors or a semiconductor chip.

The units illustrated in FIG. 2 are examples, and specific implementation of the units is not limited. That is, hardware corresponding to each of the units may not be necessarily implemented, and the functions of the units may be implemented by causing a processor to execute a program. In addition, in the foregoing embodiment, some of the functions implemented by the software may be implemented as hardware, or some of the functions implemented as the hardware may be implemented as software. Other detailed configurations of the multifunction machine 1, the information processing server 3, and the terminal device 4 can be arbitrarily modified without departing from the gist of the present disclosure.

In addition, for example, the steps of the operations illustrated in FIGS. 4 to 7 are obtained by dividing the operations based on main details of the processes in order to make it easier to understand the operations of the devices of the information processing system 1000. The present disclosure is not limited by the method for dividing the operations into the processes and the names of the processes. The operations may be divided based on details of the processes such that the number of steps is larger. In addition, the operations may be further divided such that one or more of the steps includes a larger number of processes. The order of the steps may be changed without departing from the gist of the present disclosure.

What is claimed is:

1. An information processing device comprising:
   one or more processors; and
   a storage medium that stores a learning model, which is machine-learned based on a data set in which image data of a teaching material content is associated with attribute information indicating an attribute of the teaching material content, and that stores instructions that, when executed by the one or more processors, cause the information processing device to perform operations comprising:
   receiving print request information including data name information and the image data for the teaching material content;
   acquiring the image data;
   searching for a keyword stored in a keyword management database from the data name information;
   when the keyword is found from the data name information, identifying, from the keyword management database, a subject name, a course name, and a unit name associated with the keyword;
   determining whether or not the subject name, the course name, and the unit name have been identified; and
   when it is determined that the subject name, the course name, and the unit name have not been identified:
      inputting the acquired image data to the learning model and outputting the subject name, the course name, and the unit name from the learning model; and
      storing association information in which the acquired image data is associated with the subject name, the course name, and the unit name output from the learning model.

2. The information processing device according to claim 1, wherein the operations further comprise:
   identifying the attribute from a data name of the acquired image data based on the association information.

3. The information processing device according to claim 2, wherein the operations further comprise:
   updating the learning model based on the data set that includes the acquired image data from which the attribute is identified, and the attribute information indicating the attribute is included.

4. The information processing device according to claim 1, wherein
   the information processing device is connected to a teaching material content providing server, and
   the image data is acquired from the teaching material content providing server.

5. The information processing device according to claim 1, wherein
   the information processing device is connected to a printing device of a learner, and
   the operations further comprises transmitting print data including the acquired image data to the printing device.

6. The information processing device according to claim 1, wherein
the attribute is at least one of the subject name, the course name, and the unit name.

7. A learning device comprising:
one or more processor; and
a storage medium that stores instructions that, when executed by the one or more processors, cause the learning device to perform operations comprising:
receiving print request information including data name information and image data for a teaching material content;
acquiring the image data;
searching for a keyword stored in a keyword management database from the data name information;
when the keyword is found from the data name information, identifying, from the keyword management database, a subject name, a course name, and a unit name associated with the keyword;
determining whether or not the subject name, the course name, and the unit name have been identified; and
when it is determined that the subject name, the course name, and the unit name have not been identified;
inputting the acquired image data to a learning model and outputting the subject name, the course name, and the unit name from the learning model;
performing machine learning based on a data set; and
storing a learning model, which trained by the machine learning.

8. A method for controlling an information processing device, comprising:
storing a learning model, which is machine-learned based on a data set in which image data of a teaching material content is associated with attribute information indicating an attribute of the teaching material content;
receiving print request information including data name information and the image data for the teaching material content;
acquiring the image data;
searching for a keyword stored in a keyword management database from the data name information;
when the keyword is found from the data name information, identifying, from the keyword management database, a subject name, a course name, and a unit name associated with the keyword;
determining whether or not the subject name, the course name, and the unit name have been identified; and
when it is determined that the subject name, the course name, and the unit name have not been identified:
inputting the acquired image data to the learning model based on the data set, and outputting the subject name, the course name, and the unit name from the learning model; and
storing association information in which the acquired image data is associated with the subject name, the course name, and the unit name output from the learning model.

* * * * *